United States Patent [19]

Tanaka et al.

[11] Patent Number: 4,797,908

[45] Date of Patent: Jan. 10, 1989

[54] VOLTAGE-RESONANCE TYPE POWER SUPPLY CIRCUIT FOR X-RAY TUBE

[75] Inventors: Shigeru Tanaka, Ootawara; Fumio Ishiyama, Nishinasuno, both of Japan

[73] Assignee: Kabushiki Kaisha Toshiba, Kawasaki, Japan

[21] Appl. No.: 773,208

[22] Filed: Sep. 6, 1985

[30] Foreign Application Priority Data

| | | | |
|---|---|---|---|
| Sep. 14, 1984 | [JP] | Japan | 59-194113 |
| Sep. 14, 1984 | [JP] | Japan | 59-194114 |
| Dec. 5, 1984 | [JP] | Japan | 59-258142 |

[51] Int. Cl.[4] .................. H02M 3/315; H05G 1/12; H05G 1/20; H05G 1/32

[52] U.S. Cl. .................. 378/105; 363/028; 378/112; 378/114

[58] Field of Search .................. 378/101, 102, 103, 105, 378/111, 112, 114; 363/28

[56] References Cited

U.S. PATENT DOCUMENTS

| | | | |
|---|---|---|---|
| 4,295,049 | 10/1981 | Ebersberger et al. | 250/409 |
| 4,573,184 | 2/1986 | Tanaka et al. | 378/105 |
| 4,614,999 | 9/1986 | Onodera et al. | 378/110 |

FOREIGN PATENT DOCUMENTS

0108336A3 5/1984 European Pat. Off. .

OTHER PUBLICATIONS

Tietze, V. et al., *Halbleiter-Schaltungstechnik*, Springer-Verlag, p. 576.

*Primary Examiner*—Craig E. Church
*Assistant Examiner*—T. N. Grigsby
*Attorney, Agent, or Firm*—Finnegan, Henderson, Farabow, Garrett and Dunner

[57] ABSTRACT

A power supply circuit of voltage resonance type for supplying a high DC voltage to an X-ray tube includes a transformer, a capacitor for forming a resonance circuit in cooperation with a primary winding of the transformer, and a rectifier circuit coupled with a secondary winding of the transformer for supplying a high DC voltage to the x-ray tube. At the beginning of the operation of the power supply circuit, a great change of resonance conditions is offset to quicken the rise of the X-ray tube voltage. To this end, a power supply drive circuit to enable (turn on) the switches is arranged to prevent the switches from being enabled before one cycle of the resonance current in the resonance circuit is completed.

6 Claims, 12 Drawing Sheets

VOLTAGE-RESONANCE TYPE POWER SUPPLY CIRCUIT FOR X-RAY TUBE

BACKGROUND OF THE INVENTION

This invention relates to a high voltage generating power supply circuit for an X-ray tube, and more particularly to a power supply circuit of a voltage-resonance type.

Power supply circuits of a high frequency inverter type, which allow the use of a small size transformer, have widely been used for a high voltage power supply circuit for X-ray tubes. In this type of power supply circuit, a main switch and a subswitch are connected in series to each other in order to couple a primary winding of a transformer with a DC power source. A capacitor is connected in parallel to the main switch. When the main switch is open, the capacitor, together with the primary winding of the transformer, forms a series resonance circuits across the DC power source. Damper diodes are connected across the main switch and the subswitch, respectively. The secondary winding of the transformer is coupled with a bridge rectifier circuit. The bridge rectifier circuit is connected through cables to an X-ray tube. By operating the switches by a drive circuit, the primary current flows into the primary circuit of the transformer, so that a high voltage is produced in the secondary winding. The high voltage, 50 KV to 150 KV, is rectified by the bridge rectifier circuit, and supplied to the X-ray tube. The high voltage applied to the X-ray tube is adjusted by changing ON times of the main switch and the subswitch, while keeping the switching frequency constant. This control system is called a pulse modulation system.

The conventional power supply circuit of this type involves the following problems. Since the power supply circuit and the X-ray tube are connected by cables, resonance conditions of the resonance circuit greatly change with a rise in the tube voltage, that is, at the beginning of the operation of the drive circuit. The reason for this is that since cable capacitance is connected in parallel with the rectifier circuit, the secondary circuit of the power supply circuit is short-circuited due to the cable capacitance at the beginning of the operation. The transient phenomenon greatly disturbs the primary current of the transformer. As a result, energy is not smoothly transferred from the primary circuit to the secondary circuit of the transformer, and the rise of the X-ray tube voltage is slow.

Generally, X-rays emitted from the X-ray tube before the tube voltage reaches a desired voltage, does not contribute to the diagnosis. The slow rise of the tube voltage is accompanied by increases in the unnecessary radiation of X-rays and of the amount of X-rays radiated to a patient. Particularly, low energy x-rays radiated during the rise of the tube voltage (when the tube voltage is low) are liable to be absorbed by the human body. In this respect, the slow rise of the tube voltage cannot be ignored.

In the case of a power supply circuit for X-ray tubes with a tetrode circuit using a tetrode (high voltage switching four-element tube), the rise of the tube voltage is quick and free from the above-mentioned problem. The tetrode circuit, however, is large in size and weight, and costly.

SUMMARY OF THE INVENTION

Accordingly, an object of this invention is to provide an improved high voltage power supply circuit for an X-ray tube.

Another object of this invention is to provide an improved power supply circuit for an X-ray tube which is small in size, light in weight and low in cost.

Still another object of this invention is to provide an improved power supply circuit for an X-ray tube of the voltage resonance type, which is so arranged as to quicken the rise of a tube voltage.

According to this invention, a power supply circuit of the voltage resonance type for generating a high voltage applied to an X-ray tube, comprises a transformer with a primary winding and a secondary winding; a capacitor coupled with the primary winding of the transformer, the capacitor and the primary winding cooperatively forming a resonance circuit; switching means for intermittently coupling a DC power source to the resonance circuit in order to flow a resonance current through the resonance circuit; power supply drive circuit means for enabling the switching means in response to an X-ray radiation instructing signal to intermittently couple the DC power source to the resonance circuit, so that a resonance current is allowed to flow through the resonance circuit to develop a high voltage in the secondary winding of the transformer; and rectifier circuit means coupled with the secondary winding of the transformer to supply a high DC voltage to the X-ray tube.

To achieve the above objects, the power supply drive circuit means is arranged so as not to enable the switch means when the resonance current is flowing through the resonance circuit.

DETAILED DESCRIPTION OF THE PREFERRED EMBODIMENTS

Figure 1:
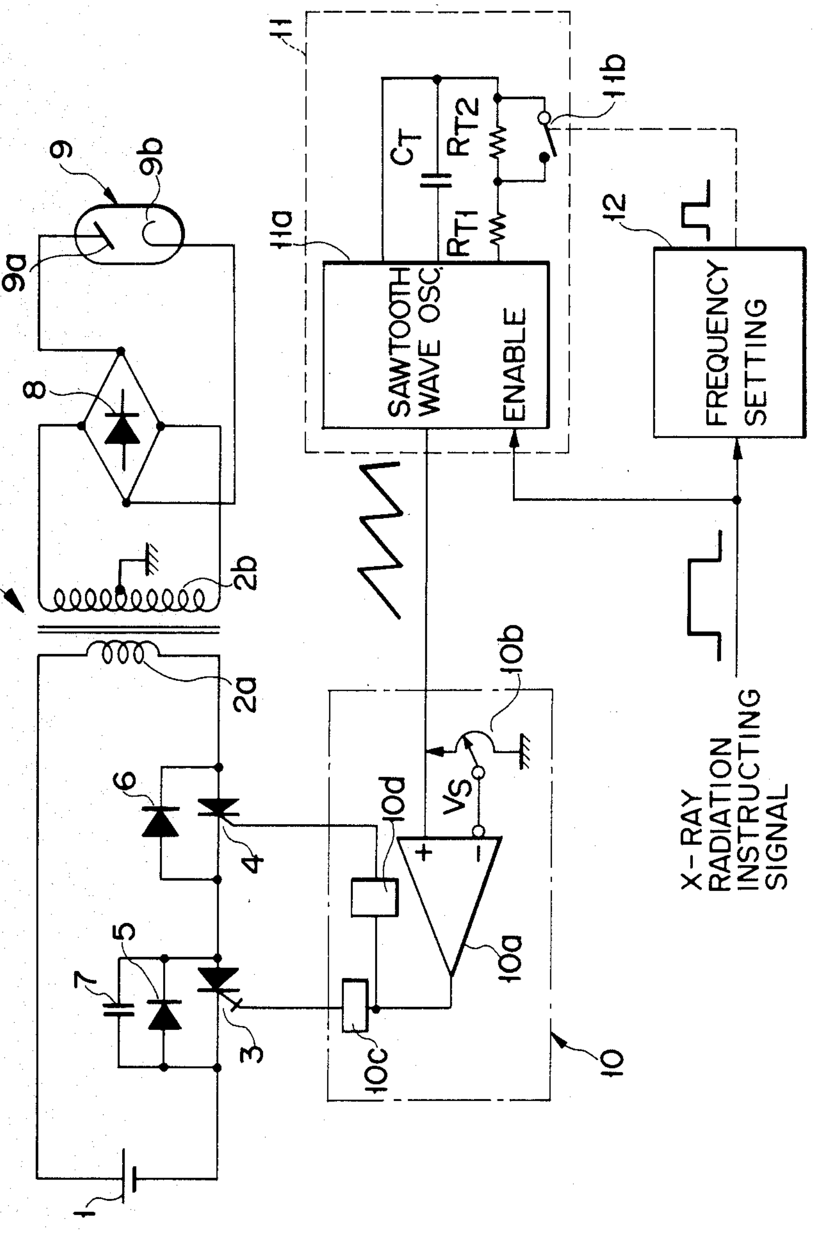
FIG. 1 is a power supply circuit according to a first embodiment of this invention.

Referring to FIG. 1, there is shown a power supply circuit for an X-ray tube embodying this invention. In the power supply circuit, a DC power source 1 and a primary winding 2a of a transformer 2 are connected through a main switch 3 and a subswitch 4 which are series-connected. Damper diodes 5 and 6 are connected across the switches 3 and 4, respectively, in a polarity relationship opposite to the polarity of DC power source 1. A capacitor 7 is further connected in parallel with main switch 3. The capacitor 7, together with the primary winding 2a of the transformer 2, forms a series resonance circuit across the DC power source 1. A secondary winding 2b of the transformer 2 is connected to a bridge rectifier circuit 8. The bridge rectifier circuit 8 applies a rectified voltage between an anode 9a and a cathode 9b of an X-ray tube 9, through cables.

The main switch 3 is preferably formed of a unidirectional semiconductor switching element of the self-extinction type such as a bipolar transistor or GTO (gate turn-off) thyristor in which its conduction state depends only on a control voltage applied to a control electrode such as a base electrode. A preferable switching element for the subswitch 4 is a unidirectional semiconductor switching element, such as a nonself-extinction type thyristor, which is turned on by a control signal applied to the control electrode and is turned off when the current flowing therethrough decreases below a holding current.

The main switch 3 and the subswitch 4 are controlled by a power supply drive circuit. The drive circuit comprises a switch control circuit 10, a sawtooth wave generating circuit 11 and a frequency setting circuit 12 to determine the frequency of a sawtooth wave.

The saw-tooth wave generating circuit 11 includes a saw-tooth wave oscillator 11a, series-connected resistors $R_{T1}$ and $R_{T2}$ and a capacitor $C_T$ coupled in parallel with the series resistors. These resistors and capacitor determine the oscillating frequency of saw-tooth waves. A normally closed switch 11b is connected across the capacitor $C_T$. The frequency setting circuit 12 is a timer circuit, which may be constructed with a monostable circuit. An X-ray radiation instructing signal is applied to the oscillator 11a and the frequency setting circuit 12. Upon receipt of this signal, the oscillator 11a starts its oscillating operation, and the frequency setting circuit 12 produces an output pulse having a predetermined duration during which the switch 11b is opened. Due to the opening of this switch the resistor $R_{T2}$ is operatively connected in series with the resistor $R_{T1}$, so that the oscillator 11a oscillates at a lower frequency than in the steady state in which the switch 11b is closed.

The switch control circuit 10 comprises a voltage comparator 10a which compares a reference voltage Vs derived from a reference voltage setting circuit 10b with a saw-tooth wave signal from the oscillator 11a. The former signal is applied to the inverting input of the comparator 10a, and the latter is applied to the noninverting input thereof. When the saw-tooth wave signal is higher than the reference voltage Vs, the comparator 10a produces a switch control signal. The switch control signal is applied to switch drive circuits 10c and 10d to turn on (enable) the switches 3 and 4. The drive circuit 10c produces a drive signal with a waveform suitable for turning on and off the main switch 3. The drive circuit 10d produces a drive signal with a waveform suitable for turning on the switch 4.

Before proceeding with the description of the operation of the power supply circuit as mentioned above, the general operation of the high frequency inverter type power supply circuit having the series connected switches 3 and 4 will be described. When the main switch 3 and the subswitch 4 are simultaneously turned on (enabled), the power supply circuit starts its operation. At the start, the primary current of the transformer 2, which flows through the switches 3 and 4 and the primary winding 2a, linearly increases due to inductance of the primary winding. A rising rate of the primary current is inversely proportional to the inductance as seen from the primary side of the transformer. When the main switch 3 is turned off, the primary current varies, with the initial value of the current at the turn-off time, following a waveform of a resonance current of a series resonance circuit formed by the primary winding 2a and the capacitor 7 connected across the main switch 3. Immediately after the main switch 3 is turned off, the primary current decreases to zero, while flowing through the capacitor. With this current, the capacitor 7 is gradually charged. As the primary current becomes zero, the subswitch 4 is turned off. A this time, the charge voltage across the capacitor is higher than the DC power source. Subsequently, discharge current of the capacitor 7 flows through the damper diode 6 in the opposite direction to that of the current in the previous operation. Even after the discharge of the capacitor is completed, the resonance still continues to cause the primary resonance current to flow through the damper diodes 5 and 6. When the current flowing through the damper diodes 5 and 6 becomes zero, one cycle of the resonance is completed. When the switches 3 and 4 are again turned on (enabled) by the drive signals, the next operation cycle starts. At the start, the inductance of the transformer as seen from the primary side is smaller than that in a stationary state due to a low impedance effect of the cable on the secondary side of the transformer. Accordingly, the primary current rises faster than in the stationary state, as earlier mentioned. This results in a large resonance current. When the resonance current is flowing into the damper diode 5, if the main switch 3 is turned on by the drive signal for the next cycle, no current flows through the main switch 3. This indicates that the next cycle does not start. In this state, the primary current is disturbed, that is, the peak values of the primary current repeatedly increase and decrease for several cycles. Accordingly, the energy cannot be effectively transferred from the primary side into the secondary side of the transformer. As a result, the voltage applied to the X-ray tube slowly rises. This fact causes the disadvantage of the prior art as mentioned above.

Figure 2:
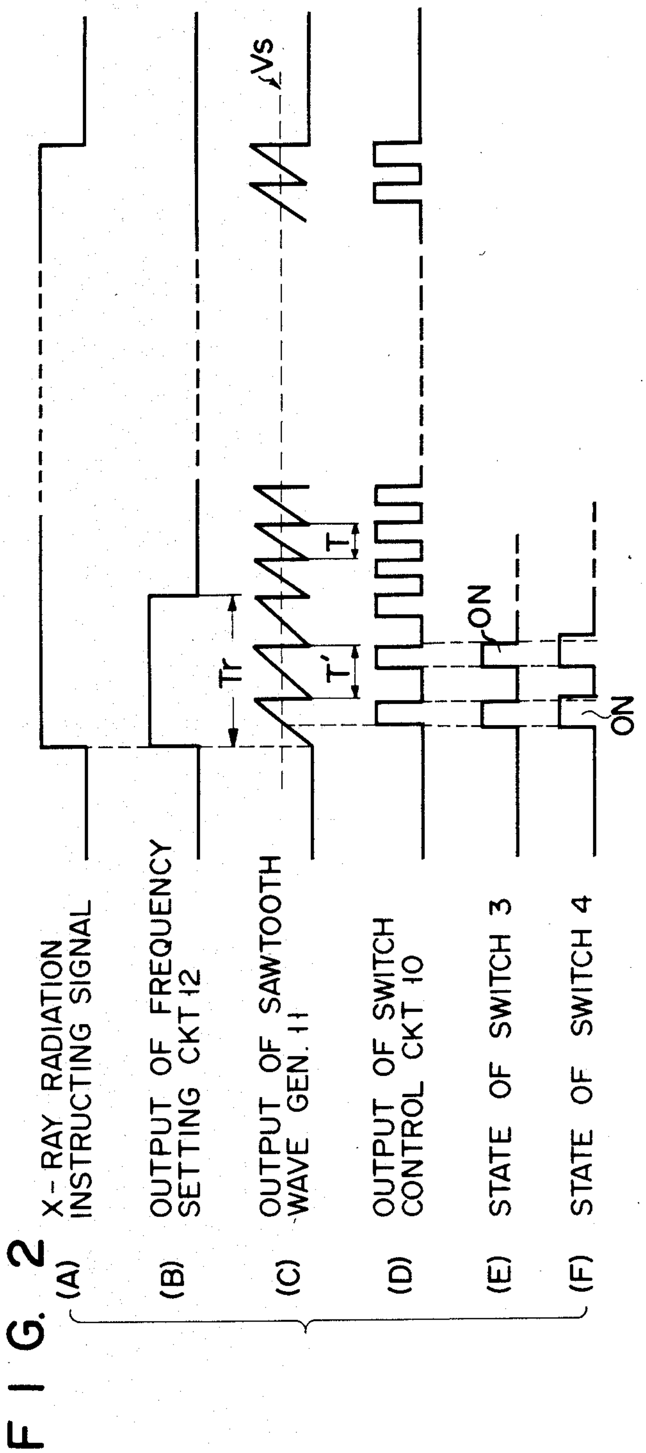
FIG. 2 shows timing charts useful in explaining the operation of the power source circuit of FIG. 1.

The operation of the power supply circuit of FIG. 1 as the first embodiment of this invention will be described referring to FIG. 2.

As shown in FIG. 2A, when the X-ray radiation instructing signal goes high, the frequency setting circuit 12 produces an output signal with a predetermined duration Tr as shown in FIG. 2B. At the same time, the oscillator 11a starts to generate a saw-tooth wave signal as shown in FIG. 2C. The output pulse from the frequency setting circuit 12 opens the switch 11b in the saw-tooth wave generating circuit 11 during the period of time Tr. The sawtooth wave signal from the oscillator 11a is applied to the reference voltage setter 10b in the switch control circuit 10 where it is compared with the reference voltage Vs. The reference comparator 10*b* produces switch control pulses (FIG. 2D) with a high level when the saw-tooth wave signal exceeds the reference voltage Vs. In response to the switch control pulses, the switch drive circuits 10*c* and 10*d* form switch drive signals to drive the switches 3 and 4, respectively. By the switch drive signals, the main switch 3 and the subswitch 4 are switched, as illustrated in FIGS. 2E and 2F. It is noted that the ON time of the subswitch 4 is longer than that of the main switch 3, since the former is of the nonself-extinction type. The ON time of the switch can be changed by varying the reference voltage Vs, so that the X-ray tube voltage can also be changed.

When the switch 11*b* is closed, the oscillating frequency f of the oscillator 11*a* is given by $$f = 1/T = 1/(R_{T1} \times C)\ (\text{Hz}) \quad (1)$$

where T is a period of the saw-tooth wave signal.

When the switch 11*b* is open the oscillating frequency f' is given by $$f' = 1/T' = 1/(R_{T1} + R_{T2}) \times C\ (\text{Hz}) \quad (2)$$

As seen from the above equations, the oscillating frequency of the oscillator 11*a* when the switch 11*b* is closed is higher than that when it is open. The period of the saw-tooth wave signal when the switch 11*b* is open (at the start of operation) is longer than that when it is closed (stationary state). The values of the resistors $R_{T1}$ and $R_{T2}$ are related as follows:

$$T'/T = (R_{T1} + R_{T2})/R_{T1} \approx 1.2 \quad (3)$$

Figure 3:
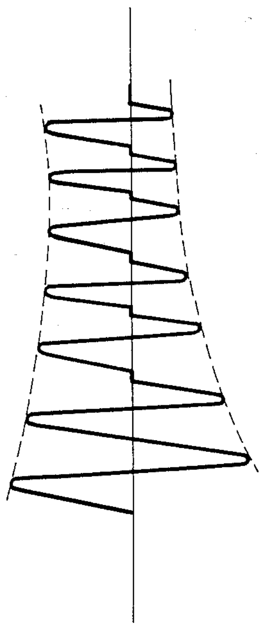
FIG. 3 shows a waveform of the primary current of a transformer used in the power source circuit of this invention.

In this embodiment, the switching frequency of the switches 3 and 4 at the operation start (when the X-ray tube voltage rises) is set to be about 17% lower than that in the stationary state. Therefore, the primary current of the transformer 2 is not disturbed at the rise of the X-ray tube voltage, as shown in FIG. 3. Thus, the peak values of the primary current never fluctuate prior to the stationary state.

An experiment as conducted showed that in the prior art device, the time taken for the X-ray tube voltage to rise was 0.4 to 0.5 msec, while in the power source circuit of this embodiment, it was 0.3 msec or less. This performance is comparable with that of the tetrode circuit. In this invention, this is realized by setting the switching frequency of the switches 3 and 4 at the rise of the X-ray tube voltage to be lower than that in the stationary state. Due to this operation, a change in the resonance condition of the resonance circuit, which inevitably occurs at the start of the operation, is absorbed, thereby to stabilize the circuit operation.

Figure 4:
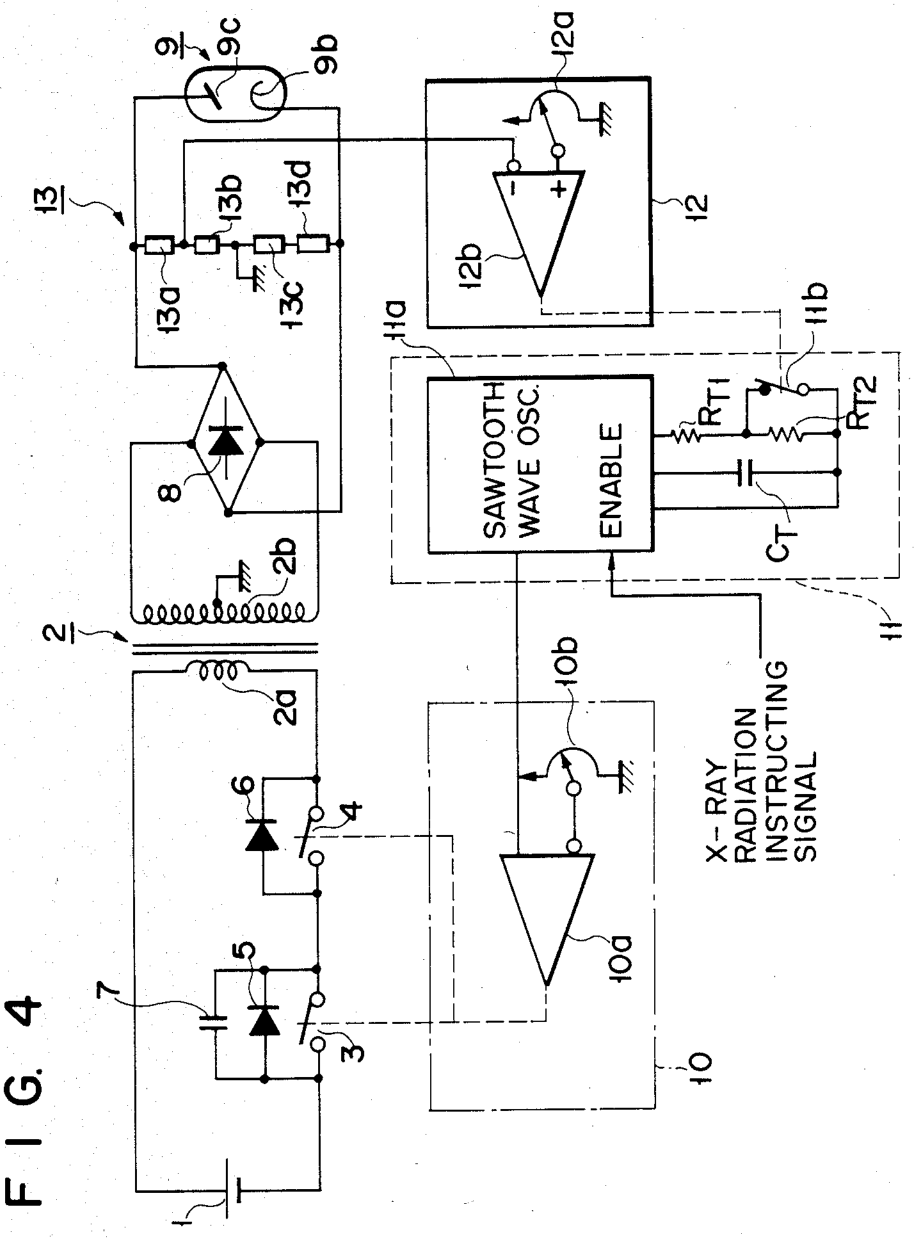
FIG. 4 is a circuit diagram according to a second embodiment of this invention.
Figure 5:
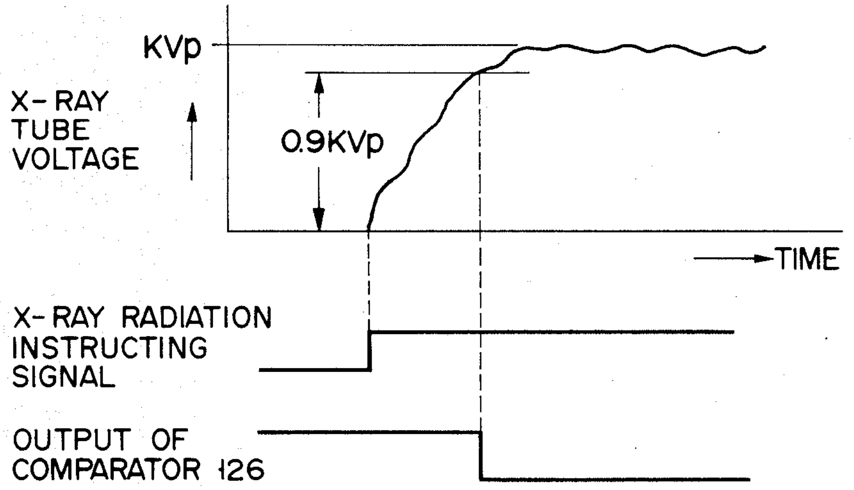
FIG. 5 shows waveforms for explaining the operation of the second embodiment.

Another embodiment of a power supply circuit according to this invention will be described referring to FIGS. 4 and 5. The difference of this embodiment from the previous one mainly resides in the arrangement of the frequency setting circuit 12. As shown, on the output side of the bridge rectifier circuit 8 is connected to an X-ray tube voltage detect circuit 13. The detect circuit 13 is formed of a voltage dividing circuit 13 having series connected resistors 13*a* to 13*d*, which are connected between the anode 9*a* and the cathode 9*b* of the X-ray tube. The mid point of voltage dividing circuit 13 is connected to ground.

The frequency setting circuit 12 comprises a voltage comparator 12*b*. To the inverting input of the comparator 12*b* is coupled a voltage with a positive polarity derived from a node between the resistors 13*a* and 13*b* in the voltage dividing circuit. To the noninverting input terminal of the comparator is coupled the reference voltage taken from the reference voltage setting circuit 12*a*. The output of the comparator 12*b* is coupled to the normally closed switch 11*b* in the saw-tooth wave generating circuit 11, as in the first embodiment.

Assuming that a voltage across the X-ray tube is KVp (V), in the stationary state, and a voltage dividing ratio of the voltage dividing circuit is 1:B, KVp/B voltage is input to the inverting input of the comparator 12*b*. A reference voltage of the reference voltage setting circuit 12*a* is set to 0.9×Vp/B.

When the switches 3 and 4 are not enabled, the X-ray tube voltage is 0 V. At this time, the comparator 12*b* produces a high level voltage, which in turn opens the normally closed switch 11*b*. Under this condition, if the X-ray radiation instruction signal is applied to the oscillator 11*a*, the oscillator oscillates at the frequency f' as defined by equation (2). Then, the switches 3 and 4 are enabled and the X-ray tube voltage rises. When the tube voltage detected by the tube voltage detect circuit 13 exceeds 0.9×KVp/B, the output voltage of the comparator 12*b* goes low. As a result, the switch 11*b* is closed. Under this condition, the oscillator 11*a* oscillates at the frequency f as defined by equation (1). Thus, the oscillating frequency of the saw-tooth wave is set lower than that in the stationary state until the X-ray tube voltage rises up to 90% of the normal tube voltage. Therefore, this embodiment also provides a rapid rise in the tube voltage, like the first embodiment.

Figure 6:
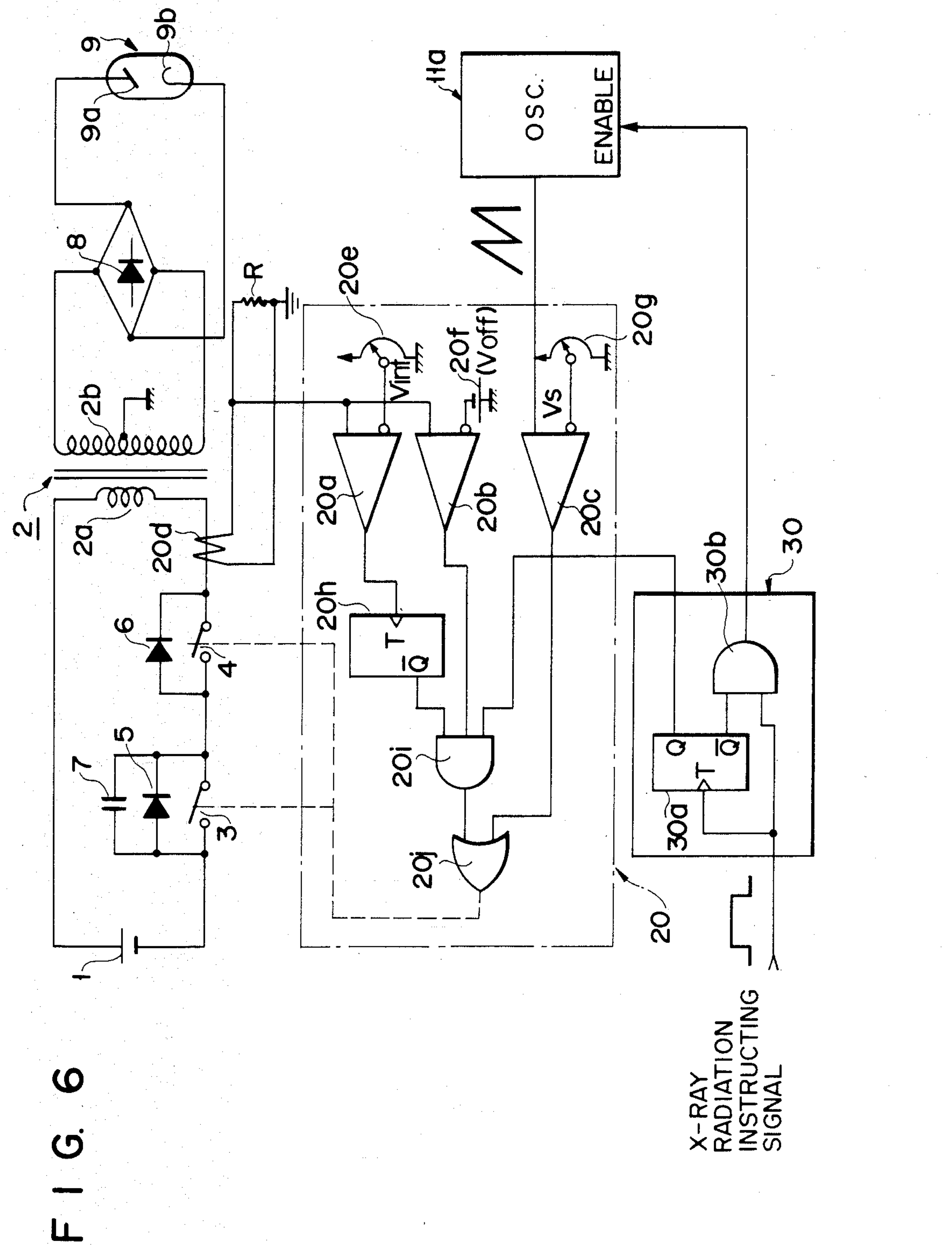
FIG. 6 is a circuit diagraom according to a third embodiment of this invention.

Still another embodiment of a power supply circuit according to this invention will be described referring to FIG. 6. In this Figure, like reference symbols are used for like or equivalent portions in the previous embodiments. The power supply circuit of this embodiment additionally includes a switch control circuit 20 to control the switches 3 and 4 in first and second control modes, and a mode select circuit 30 to select either of the first and second control modes of the switch control circuit 20.

The mode select circuit 30 includes a monostable circuit 30*a* for generating a pulse signal with a predetermined duration (substantially equal to the rise time of the X-ray tube voltage) in response to the rise of the X-ray radiation instructing signal, and an AND gate 30*b* for ANDing the inverted output Q of the monostable circuit and the instructing signal. The output of the AND gate 30*b* is coupled with an ENABLE terminal of the oscillator 11*a*.

The switch control circuit 20 executes the first and second control modes to control the switches 3 and 4. To this end, the control circuit 20 is provided with voltage comparators 20*a* to 20*c*. To detect the primary current of the transformer 2, a current transformer 20*d* is coupled to the primary circuit. The detected primary current is converted, by a resistor R, into a corresponding voltage. The voltage across the resistor R is applied to noninverting inputs of the voltage comparators 20*a* and 20*b*. To the inverting input of the comparator 20*a* is coupled a reference voltage Vint from a reference voltage setting circuit 20*e*. To the inverting input of the comparator 20*b* is coupled an offset voltage Voff with negative polarity of approximately 10 mV from an offset voltage source 20F. The inverting input of the comparator 20c is coupled with the reference voltage Vs to be compared with the saw-tooth wave signal derived from the oscillator 11a.

The output of the voltage comparator 20a is coupled to a trigger input of a monostable circuit 20h. The monostable circuit 20h is triggered by the leading edge of the output voltage of the voltage comparator 20a to produce at the inverted output Q a negative pulse signal with a predetermined duration. The duration of the pulse is selected to be approximately half the switching period of switches 3 and 4. The inverted output Q of the monostable circuit 20h, the output of the comparator 20b, and the noninverted output Q of the monostable circuit 30a in the mode select circuit 30 are ANDed by the AND gate 20i. The output of the AND gate 20i and the output of the comparator 20c are ORed by an OR gate 20j. The output of the OR gate 20j is used for controlling the main switch 3 and the subswitch 4.

Figure 7:
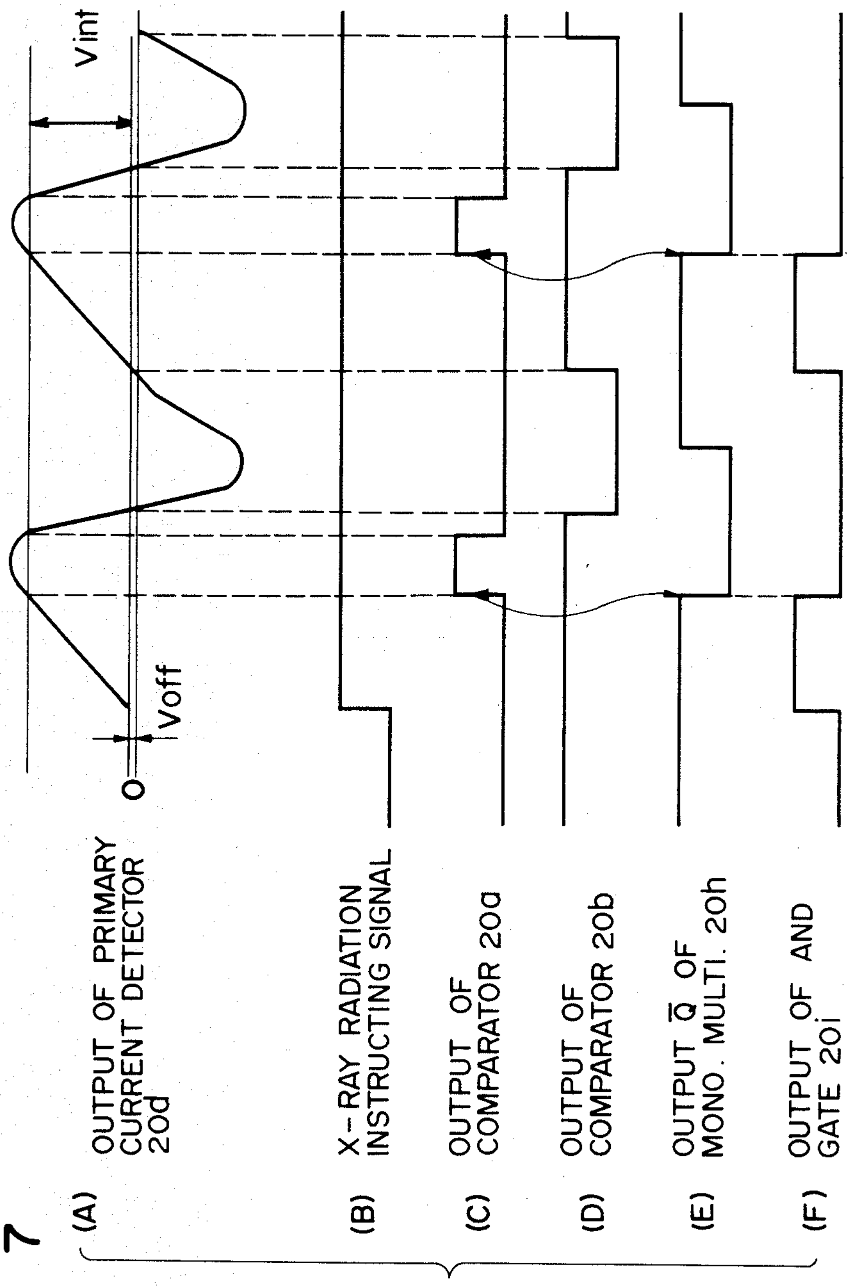
FIG. 7 shows timing charts for explaining the operation of the third embodiment.

The operation of the power supply circuit will be described referring to FIG. 7. Before the X-ray radiation instructing signal arrives, the noninverted output Q of the monostable circuit 30a of the mode select circuit 30 remains low. The output of the AND gate 30b is also low. Accordingly, the AND gate 20i is also low. The oscillator 11a is not in operation, and thus the output of the voltage comparator 20c is low. Accordingly, the output of the OR gate 20j is low and the switches 3 and 4 remain open. Under this condition, no primary current flows, so that the output of the voltage comparator 20a is low, while the output of the voltage comparator 20b is high. The inverted output Q of the monostable circuit 20h is high.

Under this condition, when the instructing signal (FIG. 7B) arrives, the noninverted output Q of the monostable circuit 30a goes high. The output of the AND gate 20i also goes high, as shown in FIG. 7F. As a result, the switches 3 and 4 are closed. Then, the primary current starts to flow and increases with time. The primary current is detected by the current transformer 20d and the voltage across the resistor R increases with time, as shown in FIG. 7A. When this voltage increases above the reference voltage Vint, the output of the comparator 20a goes high, as shown in FIG. 7C. As a result, the inverted output $\overline{Q}$ of the monostable circuit 20h becomes low in level, and the output of the AND gate 20i becomes low as shown in FIGS. 7E and 7F. At this time, the main switch 3 opens, and then a resonance current flows. When the voltage across the resistor R decreases below the reference voltage Vint, the output of the comparator 20a becomes low, as shown in FIG. 7C. When the resonance current is inverted and the detected voltage across the resistor R is below the offset voltage Voff, the output of the comparator 20b goes low. This state continues until the detected voltage exceeds the offset voltage, that is, one cycle of the resonance is almost completed.

The comparator 20b is provided for preventing the switches 3 and 4 from closing (enabling) before the completion of one cycle of the resonance. When the detected voltage exceeds the offset voltage Voff, the output of the comparator 20b goes high, to cause the output of the AND gate 20i to go high. As a result, the switches 3 and 4 are turned on (enabled). Then, this sequence of operation is repeated until the rise time of the X-ray tube voltage elapses, in other words until the output state of the monostable circuit 30a in the mode select circuit 30 is inverted.

The operation of the power supply circuit so far described is the first control mode. The operation after the X-ray tube voltage has risen is performed in the second control mode. In the first control mode, the turn off control of the main switch 3 is based on the primary current. The primary current (cut off current) when the main switch 3 is turned off is set to a fixed value (the primary current corresponding to the voltage Vint) near the maximum value of the resonance current.

When the inverted output $\overline{Q}$ of the monostable circuit 30a in the mode select circuit 30 goes high, the second control mode starts. At this time, the X-ray radiation instructing signal is still present. Accordingly, the output of the AND gate 30b goes high to enable the oscillator 11a. On the other hand, the noninverted output Q of the monostable circuit 30a is low, and hence the AND gate 20i is disabled. This indicates that the control system based on the detection of the primary current is not in operation.

A saw-tooth wave signal from the oscillator 11a is coupled to the noninverting input of the comparator 20c. The comparator 20c compares the saw-tooth wave signal with the reference voltage from the reference voltage setting circuit 20g, and applies a switch control pulse through the OR circuit 20j to the switches 3 and 4. The result is the operation of the power supply circuit like that in the previous embodiment. This operation continues until the instructing signal becomes low. In the second control mode, the switching frequency of the switches 3 and 4 is equal to the frequency of the saw-tooth wave signal, and are fixed in this embodiment.

Figure 8:
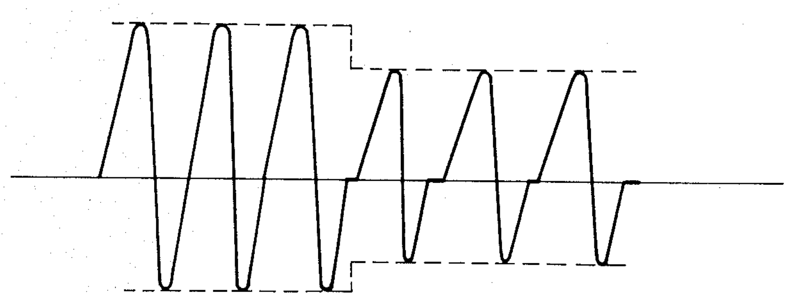
FIG. 8 shows a waveform of the primary current of a transformer used in the third embodiment.

FIG. 8 shows a waveform of the primary current in the first control mode (for the rise of the tube voltage) and the second control mode (for the stationary state). As shown, the primary current is free from the disturbance in waveform. Accordingly, the tube voltage rise can be quickened.

Figure 9:
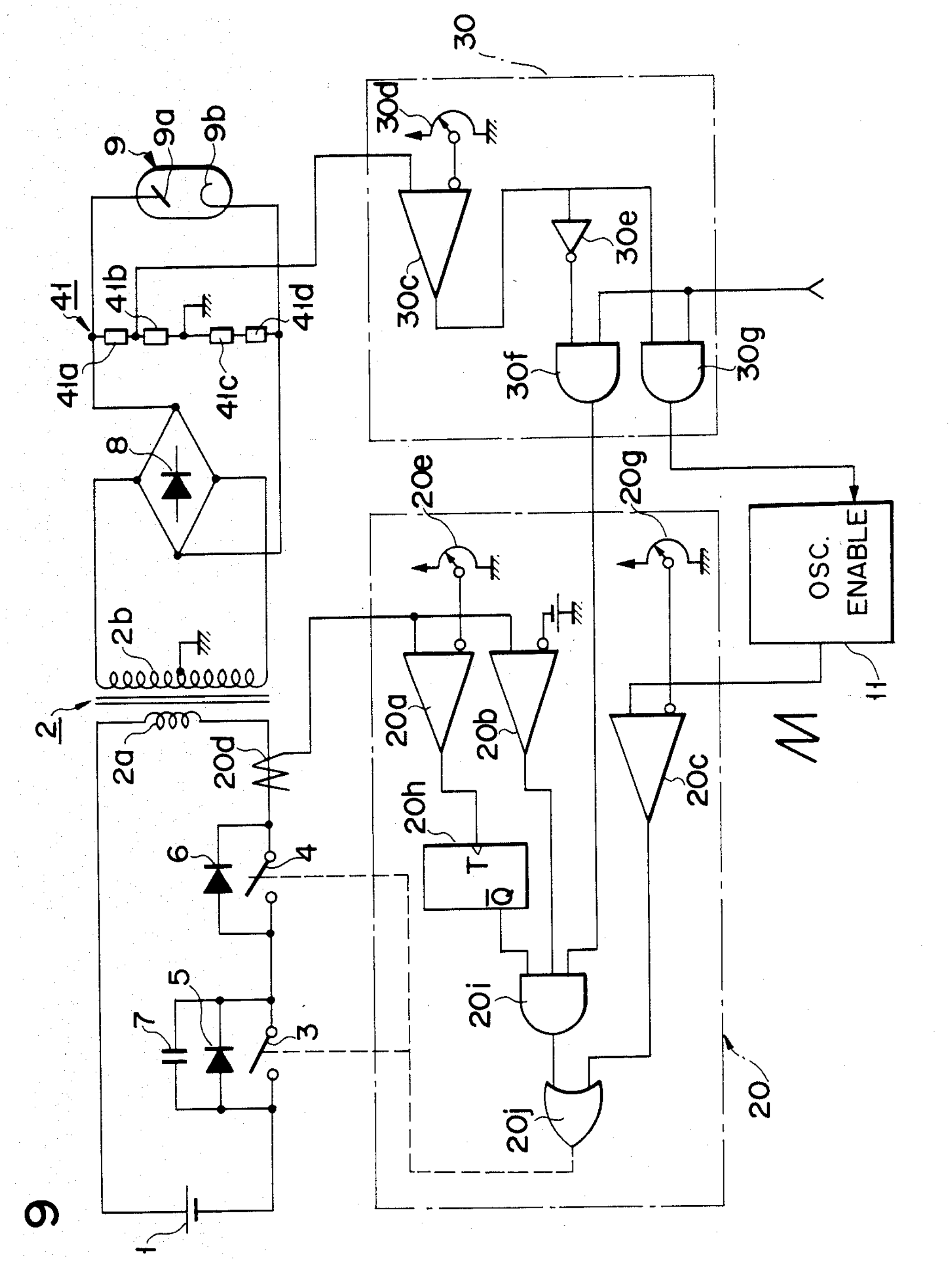
FIG. 9 is a circuit diagram of a power source circuit according to a fourth embodiment of this invention.

FIG. 9 shows a fourth embodiment of a power supply circuit according to this invention. This embodiment corresponds to the combination of the second and third embodiments. Like the second embodiment, the output of the bridge rectifier circuit 8 is coupled with a voltage dividing circuit 41 made up of resistors 41a to 41d. A node between the resistors 41a and 41b is coupled with the noninverting input of the voltage comparator 30c in the mode select circuit 30. The inverting input of the voltage comparator 30c is coupled with a reference voltage setting circuit 30d. The output of the voltage comparator 30c is connected through an inverter 30e to an AND gate 30f, and directly to an AND gate 30g. The X-ray radiation instructing signal is applied to AND gates 30f and 30g. The output of the AND gate 30f is connected to the AND gate 20i of the switch control circuit 20. The output of the AND gate 30g is connected to the ENABLE terminal of the oscillator 11a.

Figure 10:
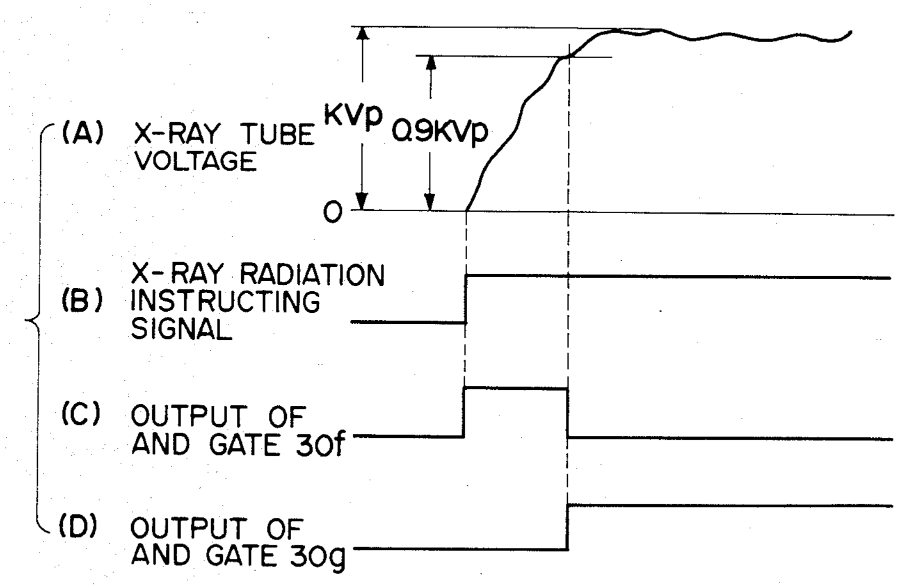
FIG. 10 shows timing charts for explaining the operation of the fourth embodiment.

The operation of this embodiment will easily be understood from the operation of the previous embodiments. As seen from FIG. 10 illustrating time charts, the primary current based control is performed from the application of the X-ray radiation instructing signal till the tube voltage rises to 90%. The subsequent operation is based on the saw-tooth wave signal from the oscillator 11a.

Figure 11:
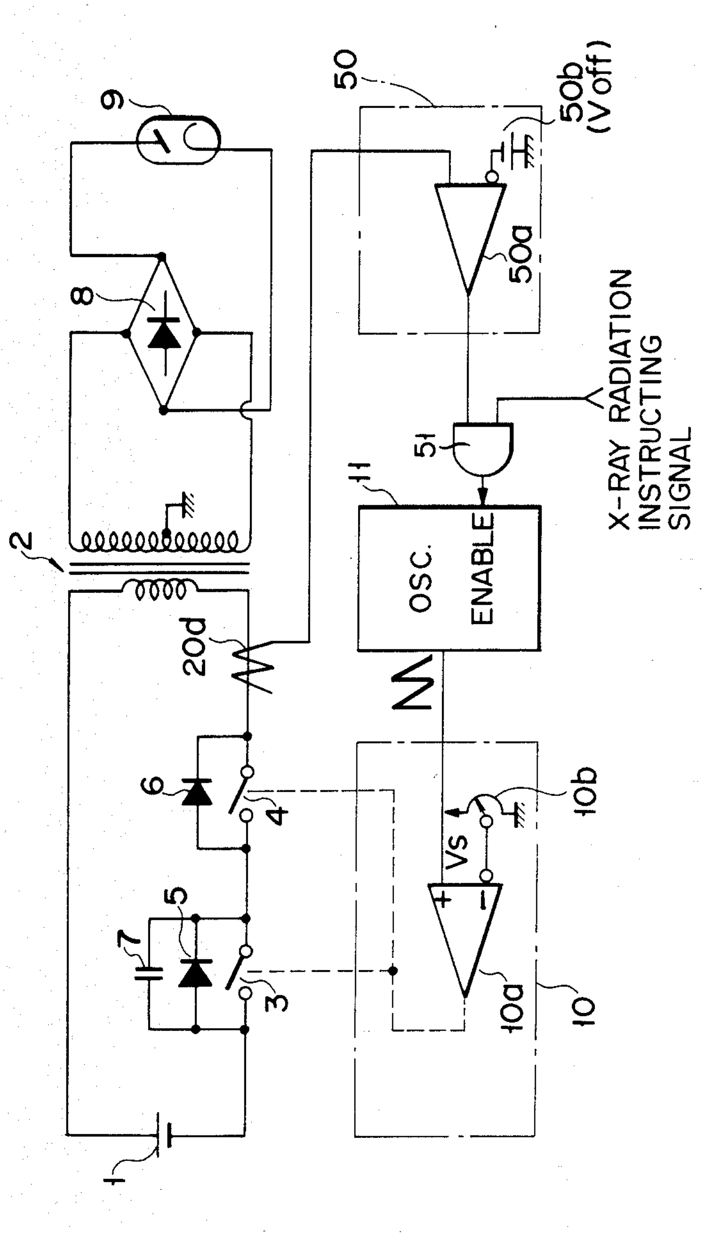
FIG. 11 is a circuit diagram of a power source circuit according to a fifth embodiment of this invention.

A fifth embodiment of a power supply circuit according to this invention will be described referring to FIG. 11.

This embodiment comprises a phase detector 50 for detecting a phase of the primary current of the transformer 2. The phase detector 50 comprises a voltage comparator 50a and an offset voltage source 50b for applying an offset voltage with negative polarity of about 10 mV to the inverting input of the comparator 50a. The primary current detector 20d is coupled with the noninverting input of the comparator 50a. An AND gate 51 ANDs the X-ray radiation instructing signal with the output of the comparator 50a. The output of the AND gate 51 is coupled with the ENABLE terminal of the oscillator 11. The output signal of the oscillator 11 is connected to the noninverting input of the comparator 10a in the switch control circuit 10. The inverting input of the comparator 10a is connected to the reference voltage setting circuit 10b. In this embodiment, the oscillator 11 is designed so as to produce a saw-tooth wave signal whose polarity is opposite to that of the saw-tooth wave signal in the previous embodiments. Further, the oscillator 11, once enabled, generates at least one cycle of the saw-tooth wave signal.

Figure 12:
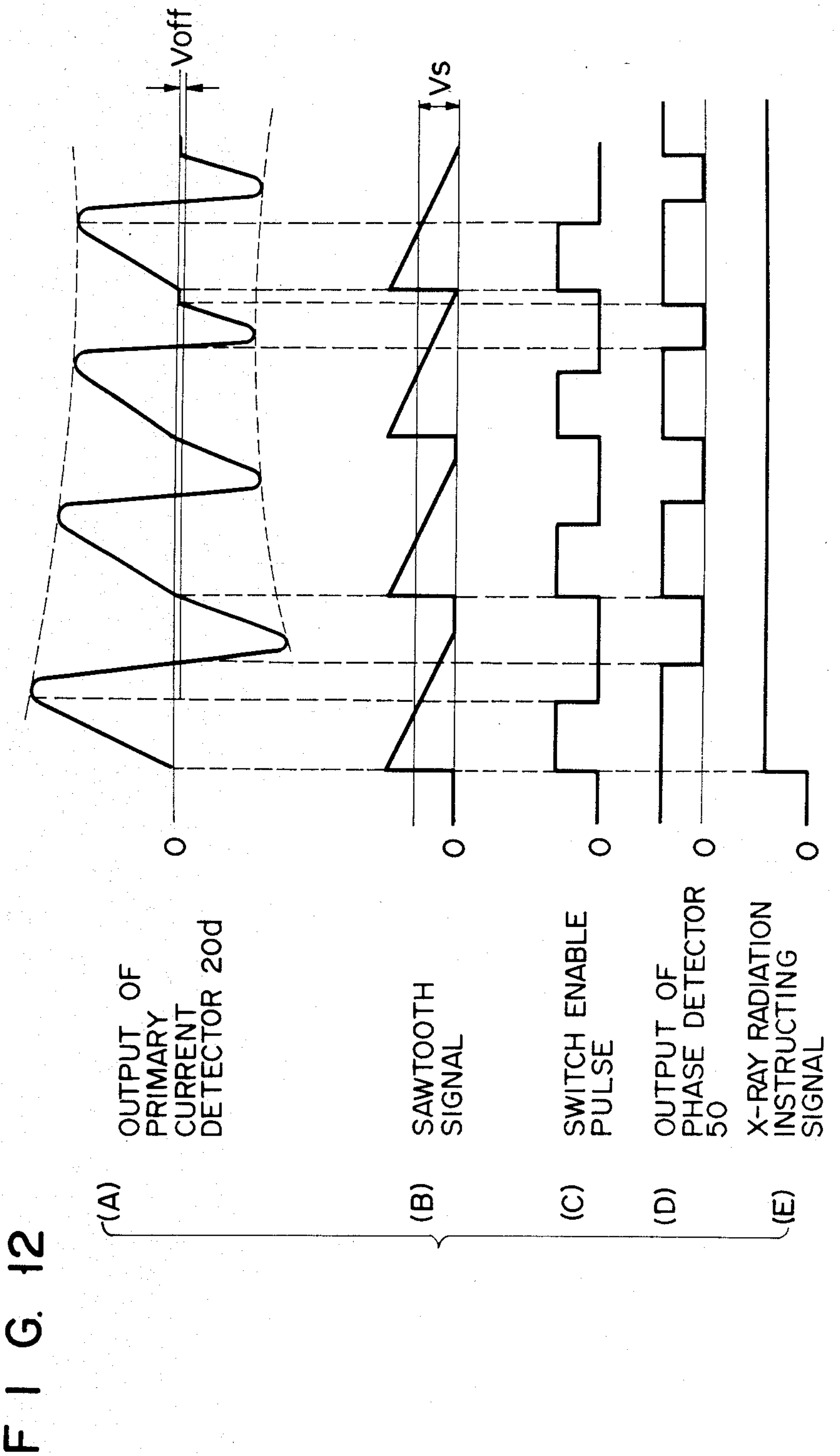
FIG 12 shows timing charts for explaining the operation of the fifth embodiment.

The operation of the power supply circuit thus arranged will be described referring to time charts of FIG. 12. When no primary current flows, the output signal of the comparator 50a is high, as shown in FIG. 12D. Under this condition, when the X-ray radiation instructing signal (FIG. 12E) arrives, the output signal of the AND gate 51 goes high to enable the oscillator 11. The saw-tooth wave signal is compared with the reference voltage Vs in the comparator 10a. Since the saw-tooth wave signal instantaneously rises, as shown in FIG. 12B, the comparator 10a produces a drive pulse for the switches 3 and 4, as shown in FIG. 12C. Accordingly, upon receipt of the instructing signal, the switches 3 and 4 are immediately closed to allow the primary current to flow, as shown in FIG. 12A. When the saw-tooth wave signal decreases below the reference voltage, the main switch 3 opens and then the resonance current flows. When the detected voltage derived from the detector 20d decreases below the offset voltage, the output signal of the phase detector 50 goes low, as shown in FIG. 12D. After the output signal of the AND gate 51 goes low, the oscillator 11 still continues its operation until one cycle of the saw-tooth wave signal is completed. When the resonance current changes and the detected voltage exceeds the offset voltage, the oscillator 11 is enabled, and the switches 3 and 4 open. The operation like the above-mentioned one follows.

In this embodiment, the resonance current and its period gradually decrease with time. In the stationary state, the resonance current flows with a period corresponding to that of the saw-tooth wave signal. As in the previous embodiment, the switches 3 and 4 are never turned on (enabled) before one cycle of the resonance is not completed. Therefore, the waveform of the primary current is not disturbed, resulting in the quick rise of the X-ray tube voltage.

Figure 13:
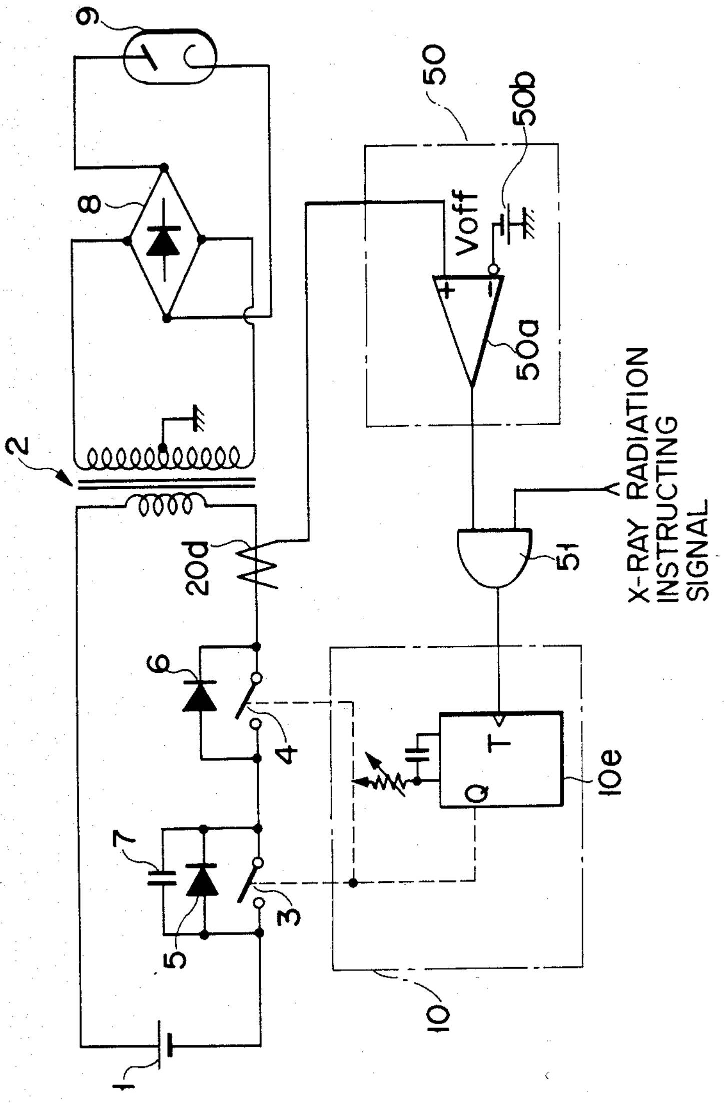
FIG. 13 is a circuit diagram of a power source circuit according to this invention.

A sixth embodiment of this invention will be described referring to FIG. 13.

This embodiment excludes the saw-tooth wave generating circuit 11 in the fifth embodiment. The switch control circuit 10 includes a monostable circuit 10e which is triggered by the output signal of the AND gate 51 coupled with the phase detector 50.

Figure 14:
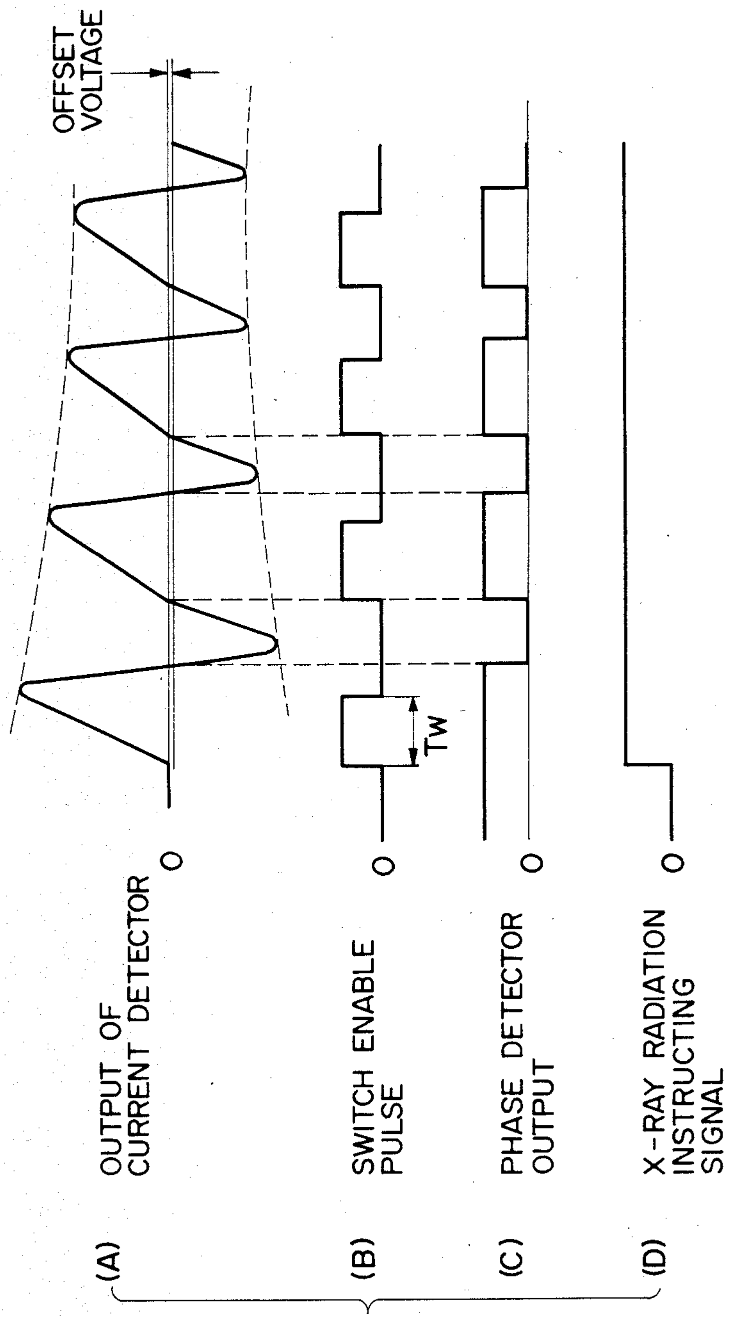
FIG. 14 shows timing charts for explaining the operation of a sixth embodiment of this invention.

In this embodiment, as shown in FIG. 14D, when the X-ray radiation instructing signal applied, the output signal of the AND gate 51 rises to trigger the monostable circuit 10e so that a switch drive pulse with a pulse width Tw is produced as shown in FIG. 14B. As a result, the main switch 3 and the subswitch 4 are turned on (enabled), and the primary current starts to flow. Simultaneously, the detected voltage from the current detector rises as shown in FIG. 14A. In this embodiment, every time the detected voltage exceeds the offset voltage, the switches 3 and 4 are turned on. In other words, the main switch 3 and the subswitch 4 are enabled for one cycle of the resonance. In this embodiment, idling periods during which the resonance (primary) current remains zero do not exist between adjacent cycles of resonance. Therefore, the ripple components decrease in the output voltage of the rectifier circuit. As shown in FIG. 13, the ON time (Tw) of the main switch 3 can be adjusted by varying the time constant of the monostable circuit 10e.

While in the above-mentioned embodiments the main switch is of the self-extinction type and the subswitch is of the nonself-extinction type, however, the subswitch may be of the self-extinction type. In this case, means must be provided for turning off the subswitch during the negative cycle of the resonance. The resonance circuit may be a parallel resonance circuit.

What is claimed is:

1. A power supply circuit for supplying a high DC voltage between an anode and a cathode of an X-ray tube, comprising:

transformer means having a primary winding for connection to a DC source and a secondary winding;

rectifier circuit means coupled to said secondary winding of said transformer means for supplying the high DC voltage between said anode and said cathode of said X-ray tube;

first switching means;

a parallel combination of a capacitor and a first diode, connected in parallel with said first switching means, said capacitor forming a resonance circuit with said primary winding of said transformer means;

second switching means, series-connected with said first switching means;

a second diode connected in parallel with said second switching means;

said first switching means and said second switching means being connected in series with both said DC source and said primary winding of said transformer means, said first diode and second diode being connected across said first switching means and said second switching means respectively in polarity relationship opposite to the polarity of the DC source;

current detection means, coupled to said primary winding of said transformer means, for detecting when AC current flowing through said primary winding of the transformer means reaches a predetermined level and for detecting the end of a cycle of the resonance waveform of the AC current flowing through said primary winding of said transformer means; and driving means for simultaneously driving said first and second switching means to turn on in response to the detection of the end of cycle of the resonance waveform of the current flowing through said primary winding of said transformer means by said current detection means and for turning off said first switching means at times when said AC current flowing through said primary winding reaches said predetermined level.

2. The circuit according to claim 1, wherein said driving means produces a drive pulse to drive said first and second switching means, said first switching means is turned on and off by the drive pulse, and said second switching means having a holding current of a predetermined value is turned on by the drive pulse and turned off by current less than said holding current flowing therethrough.

3. The circuit according to claim 1, wherein said driving means comprises:

saw-tooth wave generating means for generating a saw-tooth wave in response to the detection of the end of the cycle of the resonance waveform of the AC current by said current detection means; and comparator means for comparing the saw-tooth wave with a predetermined threshold level for simultaneously turning on said first and second switching means.

4. The circuit according to claim 1, wherein said driving means comprises a monostable circuit responsive to the detection of the end of the cycle of the resonance waveform of the AC current by said current detection means for producing the drive pulse to simultaneously turn on said first and second switching means.

5. The circuit according to claim 1, wherein said driving means includes means for driving said first and second switching means until the resonance waveform of the AC current flowing through said primary winding of said transformer means reaches a predetermined level.

6. The circuit according to claim 1, wherein said driving means includes means for driving said first and second switching means until the DC voltage across said anode and said cathode of said X-ray tube reaches a predetermined level, said driving means turning off said first switching means at times when said DC voltage reaches said predetermined level.

* * * * *